Sept. 18, 1934. A. B. GARDELLA 1,974,106

TWEEZERS

Filed May 10, 1933

INVENTOR
Albert B. Gardella
BY
Brockett, Hyde, Higley & Mayer
ATTORNEYS

Patented Sept. 18, 1934

1,974,106

UNITED STATES PATENT OFFICE 1,974,106

TWEEZERS

Albert B. Gardella, Cleveland, Ohio

Application May 10, 1933, Serial No. 670,279

3 Claims. (Cl. 128—354)

This invention relates to improvements in tweezers such as are used, for example, in removing hairs and the like, and the invention has for its general object the provision of tweezers which are of simple and inexpensive construction, of neat and pleasing appearance, of proper shape, size and weight for convenient handling and use thereof, and of strong and sturdy character.

A more specific object of the present invention is the provision of tweezers having only one of its two cooperating jaws movable, with the result that gripping and removal of hairs and the like are much more easily effected than with tweezers having both of their jaws movable.

Another more specific object of the present invention is the provision of tweezers which includes simple and improved manually operable means for effecting movement of said movable jaw, said means having a part thereof located for convenient thumb operation.

Another more specific object of the present invention is the provision of tweezers which includes an enclosing casing for the body portions of the cooperating jaws and for the movable jaw operating means, said casing being of such size, shape and weight as to enable it to be easily and conveniently gripped and handled and consisting of two readily separable parts, with the result that access to said body portions and to said jaw operating means is easily and quickly effected whenever desired.

With the foregoing and other objects in view, which will appear as the description of the invention proceeds, said invention resides in the combination and arrangement of parts and in the details of construction hereinafter described and claimed, it being understood that changes in the invention as herein disclosed can be made within the scope of what is claimed without departing from the spirit of the invention.

Figure 1:
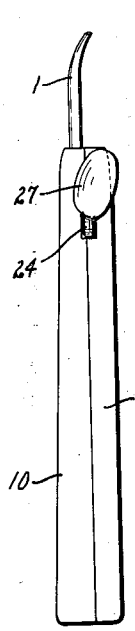
Figure 2:
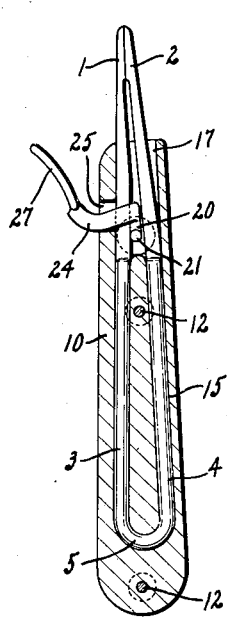
Figure 3:
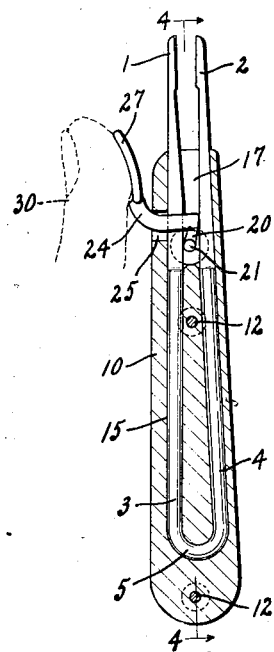
Figure 4:
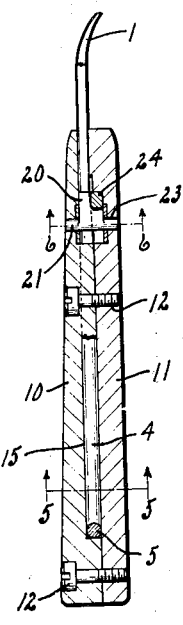
Figure 5:
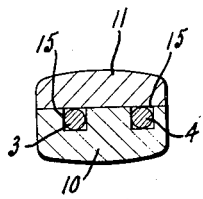
Figure 6:
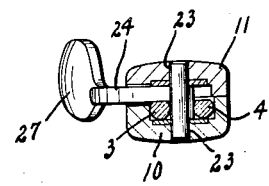
Figure 7:
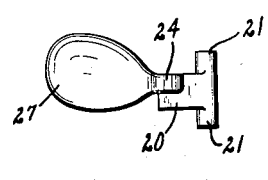
Figure 8:
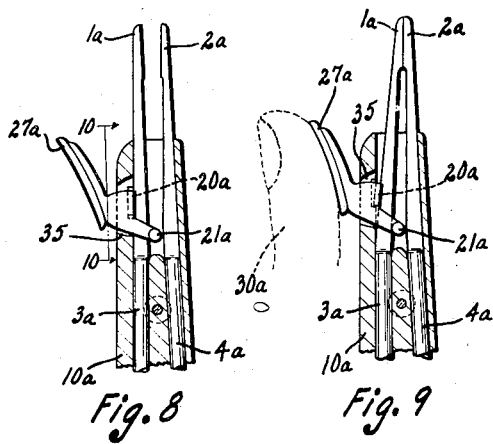
Figure 9:
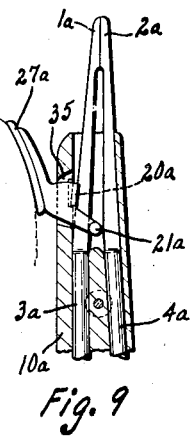
Figure 10:
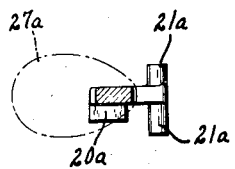

The invention will be readily understood from the following description of two embodiments thereof, reference being had to the accompanying drawing in which Fig. 1 is a side elevation of tweezers embodying the present invention; Fig. 2 is a vertical, longitudinal sectional view thereof, with the cover part of the enclosing casing removed and with the jaws in their normal closed position; Fig. 3 is a view similar to Fig. 2, but showing said jaws being held open by a thumb of the user of said tweezers; Fig. 4 is a vertical, longitudinal sectional view of said tweezers, taken on the line 4—4, Fig. 3; Figs. 5 and 6 are detail cross sectional views of said tweezers, taken on the lines 5—5 and 6—6, Fig. 4, respectively; Fig. 7 is a side elevation of the operating lever for the movable jaw of said tweezers; Fig. 8 is a view similar to Fig. 2, but showing tweezers embodying a modified form of the present invention, the jaws of these tweezers being normally open; Fig. 9 is a view similar to Fig. 8, but showing said jaws being held closed by a thumb of the user of said tweezers; and Fig. 10 is a detail sectional view of the operating lever for the movable jaw of the tweezers shown in Figs. 8 and 9, said view being taken on the line 10—10, Fig. 8.

Referring first to the tweezers shown in Figs. 1 to 7 inclusive, said tweezers includes a pair of jaw members having cooperating jaw portions 1 and 2 and body portions 3 and 4. As here shown, said jaw members are integral parts of a one piece spring metal member bent at substantially its middle, as at 5 into substantially U-form. Said spring metal member is so made that said cooperating jaw portions 1 and 2 are normally maintained closed, as indicated in Fig. 2, by the resiliency of the metal of said member.

The body portions 3 and 4 of said jaw members are enclosed in a suitable casing, of metal or other suitable material and consisting of a main part 10 and a cooperating cover part 11, said parts being removably connected by screws 12 or the like. For receiving said connected body portions, the main casing part 10 is provided with a generally U-shaped groove 15, in which the lower parts of said body portions are securely and immovably held. In order to permit lateral movement of the top part of the body portion 4, and hence, lateral movement of the jaw portion 2 connected thereto, to thereby permit opening and closing of the jaw portions 1 and 2, the material of the casing part 10 between the top parts of said body portions 3 and 4 is cut-away or removed, as indicated at 17, Figs. 2 and 3.

For effecting such lateral movement of the top part of the body portion 4 and the jaw portion 2 connected thereto, a suitable operating lever is provided, said lever in the present embodiment of the invention having an operating part 20 journalled by means of oppositely disposed trunnions 21 in the casing parts 10 and 11 between the upper parts of said jaw member body portions 3 and 4, said casing parts being provided with suitable apertures 23, Fig. 6, for receiving said trunnions. As a result, when one of the trunnions of said lever is mounted in the main casing part, as shown in Figs. 2 and 3 and in Figs. 8 and 9, the other trunnion of said lever serves to assist in properly effecting assembly with said main casing part of the cover casing part. For actuating its operating part 20, said lever is provided with a suitable actuating part 24 overlying the upper part of the jaw member body portion 3 and extending laterally outward through a suitable aperture 25 in the side wall of the main casing part 10, said actuating part terminating in a suitable thumb piece 27 located adjacent the upper end of the casing and hence adjacent the jaw portions 1 and 2 for convenient thumb manipulation by a user of the tweezers.

Normally, the lever operating part 20 is longitudinally disposed between the upper parts of the jaw member body portions 3 and 4, and the jaw portions 1 and 2 are maintained closed or in engagement by the resiliency of the metal of the member of which they are integral parts. To open or separate said jaw portions, in the use of the tweezers, it is merely necessary for the user of said tweezers to depress with his thumb 30 the thumb piece 27 of the operating lever, which depression effects clockwise movement, Figs. 2 and 3, of the lever operating part 20, and such clockwise movement effects movement to the right, Figs. 2 and 3, of the upper part of the jaw member body portion 4 and the jaw portion 2 connected thereto. When the thumb piece 27 is released, the resiliency of the metal of which the body portion 4 and jaw portion 2 are made instantly moves said jaw portion and the top part of said body portion to the left, Figs. 2 and 3, thereby effecting closing of the tweezer jaw portions, all as will be readily understood.

In the embodiment of the invention shown in Figs. 8 to 10 inclusive, the cooperating jaw portions 1a and 2a are normally maintained in open or separated position, as shown in Fig. 8, by the resiliency of the metal of the spring metal member of which they are integral parts. The operating lever for moving the movable jaw portion 1a to closed position, with respect to the stationary jaw portion 2a, as shown in Fig. 9, has trunnions 21a journalled in the casing parts 10a and 11a, but unlike the operating lever of the tweezers shown in Figs. 1 to 7 inclusive, the lever of the tweezers shown in Figs. 8 to 10 inclusive has its operating part 20a arranged in a suitable cavity 35 located between the upper part of the jaw member body portion 3a and the adjacent side wall of the casing part 10a.

For actuating the lever of the tweezers of Figs. 8 to 10 inclusive, a suitable thumb piece 27a is provided, said thumb piece, like that of the tweezers shown in Figs. 1 to 7 inclusive, being conveniently arranged adjacent the upper end of the casing. For closing the jaw portions 1a and 2a of the tweezers of Figs. 8 to 10 inclusive, it is merely necessary for the user to depress with his thumb 30a the lever thumb piece 27a, which depression effects clockwise movement of the lever actuating part 20a and such movement moves to the right the upper part of the jaw member body portion 3a and the jaw portion 1a conected thereto, thereby effecting closing movement of the jaw portions 1a and 2a. Upon release of the lever thumb piece 27a, the movable jaw portion 1a is instantly moved to the left by the resiliency of the metal of the spring metal member of which it is an integral part, thereby effecting opening of the tweezer jaw portions, all as will be readily understood.

Further features of the present invention will be apparent to those skilled in the art to which the invention relates.

What I claim is:

1. The herein described tweezers, comprising a pair of cooperating jaw members each having a body portion and a jaw portion, an enclosing casing for the body portions of said jaw members, and manually operative means pivotally mounted within said casing between the body portions of said jaw members for effecting movement of the jaw portion of one of said jaw members, said means having an actuating part located outside of said casing.

2. The herein described tweezers, comprising a pair of cooperating jaw members each having a body portion and a jaw portion, an enclosing casing for the body portions of said jaw members, and manually operative means mounted within said casing for effecting movement of the jaw portion of one of said jaw members, said means having an actuating part located outside of said casing, said casing comprising a main part provided with spaced grooves in which the body portions of said jaw members are arranged and a cover part removably connected to said main part.

3. The herein described tweezers, comprising a pair of cooperating jaw members each having a body portion and a jaw portion, a two part enclosing casing for the body portions of said jaw members, and manually operative means arranged within said casing and pivotally mounted in the two parts thereof for effecting movement of the jaw portion of one of said jaw members, said means having an actuating part located outside of said casing and the pivot of said means assisting in properly effecting assembly of one of said casing parts with the other casing part.

ALBERT B. GARDELLA.